United States Patent
Barsness et al.

(10) Patent No.: US 7,409,596 B2
(45) Date of Patent: Aug. 5, 2008

(54) APPARATUS AND METHOD FOR INITIALIZING DIAGNOSTIC FUNCTIONS WHEN SPECIFIED RUN-TIME ERROR CRITERIA ARE SATISFIED

(75) Inventors: Eric Lawrence Barsness, Pine Island, MN (US); Cary Lee Bates, Rochester, MN (US); Mahdad Majd, Rochester, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 638 days.

(21) Appl. No.: 10/932,731

(22) Filed: Sep. 2, 2004

(65) Prior Publication Data

US 2006/0048013 A1 Mar. 2, 2006

(51) Int. Cl.
*G06F 11/00* (2006.01)

(52) U.S. Cl. .............................. 714/38; 714/37; 714/39; 717/124; 717/127; 717/131

(58) Field of Classification Search ............. 714/37–39; 717/124, 127, 131; 719/318
See application file for complete search history.

(56) References Cited

U.S. PATENT DOCUMENTS

| | | | | |
|---|---|---|---|---|
| 5,907,708 A | * | 5/1999 | Hohensee et al. | 712/244 |
| 6,519,766 B1 | * | 2/2003 | Barritz et al. | 717/130 |
| 6,601,188 B1 | * | 7/2003 | Wilding | 714/15 |
| 6,928,639 B2 | * | 8/2005 | Juan et al. | 717/127 |
| 7,086,066 B2 | * | 8/2006 | Kappel et al. | 719/318 |
| 7,194,400 B2 | * | 3/2007 | Gabele et al. | 703/21 |
| 2006/0070037 A1 | * | 3/2006 | Canning et al. | 717/127 |
| 2006/0095812 A1 | * | 5/2006 | Gerard et al. | 714/38 |

\* cited by examiner

*Primary Examiner*—Robert Beausoliel
*Assistant Examiner*—Philip Guyton
(74) *Attorney, Agent, or Firm*—Martin & Associates

(57) ABSTRACT

A run-time monitor allows defining sets of run-time error criteria and corresponding diagnostic action to take when the run-time error criteria is satisfied. One way to define the run-time error criteria is to take a baseline measurement of run-time errors that occur during normal processing conditions. A run-time error criteria may then be defined that is based on the baseline measurement. In this manner, a rate of run-time errors that normally occur may be ignored, while a rate of run-time errors in excess of the run-time error criteria could automatically initiate diagnostic action. In this manner, the ability of a programmer to debug run-time errors is significantly enhanced.

9 Claims, 9 Drawing Sheets

| | 610 |
|---|---|
| Baseline | |
| 2 per second | |

| | Static | Dynamic |
|---|---|---|
| Run-time Error Criteria | 5 per second for 10 seconds | 4X baseline for 10 seconds |

| | Exception | Diagnostic Action | |
|---|---|---|---|
| 710 | java.sql.SQLException | Turn on database monitor | 712 |
| 720 | java.lang.ClassNotFound Exception | Record current classpath and classloaders being used | 722 |
| 730 | java.io.IOException | Check disk space, allow to grow in certain controlled circumstances | 732 |
| 740 | java.net.rmi.Connect Exception. | Invoke "netstat" to verify interfaces | 742 |
| 750 | java.net.SocketTimeout Exception | Invoke "netstat" to verify interfaces | 752 |
| 760 | java.rmi.RemoteException | Ping remote systems to verify they are still active | 762 |
| 770 | java.rmi.UnknownHost Exception | Check if DNS is active | 772 |

FIG. 7

APPARATUS AND METHOD FOR INITIALIZING DIAGNOSTIC FUNCTIONS WHEN SPECIFIED RUN-TIME ERROR CRITERIA ARE SATISFIED

BACKGROUND OF THE INVENTION

1. Technical Field

This invention generally relates to computer systems, and more specifically relates to apparatus and methods for diagnosing run-time problems in computer systems.

2. Background Art

Since the dawn of the computer age, computer systems have evolved into extremely sophisticated devices, and computer systems may be found in many different settings. Computer systems typically include a combination of hardware, such as semiconductors and circuit boards, and software, also known as computer programs. As advances in semiconductor processing and computer architecture push the performance of the computer hardware higher, more sophisticated computer software has evolved to take advantage of the higher performance of the hardware, resulting in computer systems today that are much more powerful than just a few years ago.

As the sophistication and complexity of computer software increase, the more difficult the software is to debug. Debugging is the process of finding problems, or "bugs", during the development of a computer program. Most modern programming environments include a debugger that provides tools for testing and debugging a computer program. Known debuggers allow the user to set one or more breakpoints in the computer program, which are points where the execution of the computer program is stopped so that the state of the program can be examined to verify that the program executed as designed.

Another type of problem that can occur is a run-time problem that is not a "bug" per se, but is a problem that arises due to run-time conditions at the time the computer program is executed. One such type of run-time problem is performance problems that arise due to excessive demand on computer system resources, such as performing an excessive number of I/O operations in a given period of time. Both bugs and run-time performance problems are collectively referred to herein as run-time errors. Most modern programming languages support defining an event known in the art as a software "exception" that represents a portion of code that is run when a defined run-time error occurs. Different exceptions may be defined to represent different run-time errors. For example, a "disk I/O exception" could be defined that is called if a write to a disk is not successful. A "class not found" exception could be defined that is called when an attempt is made to load an object oriented class that is not present. Exceptions provide a way to execute a desired portion of code when a run-time error occurs.

Programmers often use exceptions to debug their code and to find run-time errors. However, many complex computer systems in operation today routinely throw hundreds and even thousands of exceptions during normal operating conditions. When a real problem occurs, the number of exceptions can rise to even greater levels. A human programmer would have a hard time wading through thousands of logged exceptions to try to determine which occurred during normal processing and which occurred due to some unexpected problem. Without a mechanism and method for more specifically defining criteria for run-time errors, and automatically initiating diagnostic functions when the defined criteria are met, the computer industry will continue to suffer from inefficient methods and tools for locating the cause of run-time errors in a computer system.

DISCLOSURE OF INVENTION

According to the preferred embodiments, a run-time monitor allows defining sets of run-time error criteria and corresponding diagnostic action to take when the run-time error criteria is satisfied. One way to define the run-time error criteria is to take a baseline measurement of run-time errors that occur during normal processing conditions. A run-time error criteria may then be defined that is based on the baseline measurement. In this manner, a rate of run-time errors that normally occur may be ignored, while a rate of run-time errors in excess of the run-time error criteria could automatically initiate diagnostic action. In this manner, the ability of a programmer to debug run-time errors is significantly enhanced.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and:

FIG. 6 is a diagram that shows a table of baseline specification for a given run-time error, and for two different ways to define run-time error criteria for the run-time error based on the baseline specification;

FIG. 7 is a table showing sample exceptions and corresponding diagnostic action within the scope of the preferred embodiments;

BEST MODE FOR CARRYING OUT THE INVENTION

The preferred embodiments provide enhanced tools for locating run-time errors in a computer program by defining run-time error criteria and corresponding diagnostic action to be taken when the run-time error criteria are satisfied. The selection of appropriate run-time error criteria can effectively filter out run-time errors that occur during normal execution of the computer program, thereby allowing the programmer to perform a specified diagnostic action only when the run-time performance of the computer program produces a number of run-time errors that exceed a normal rate of run-time errors by some specified criteria. The result is an enhanced system for isolating run-time problems in a computer program.

Figure 1:
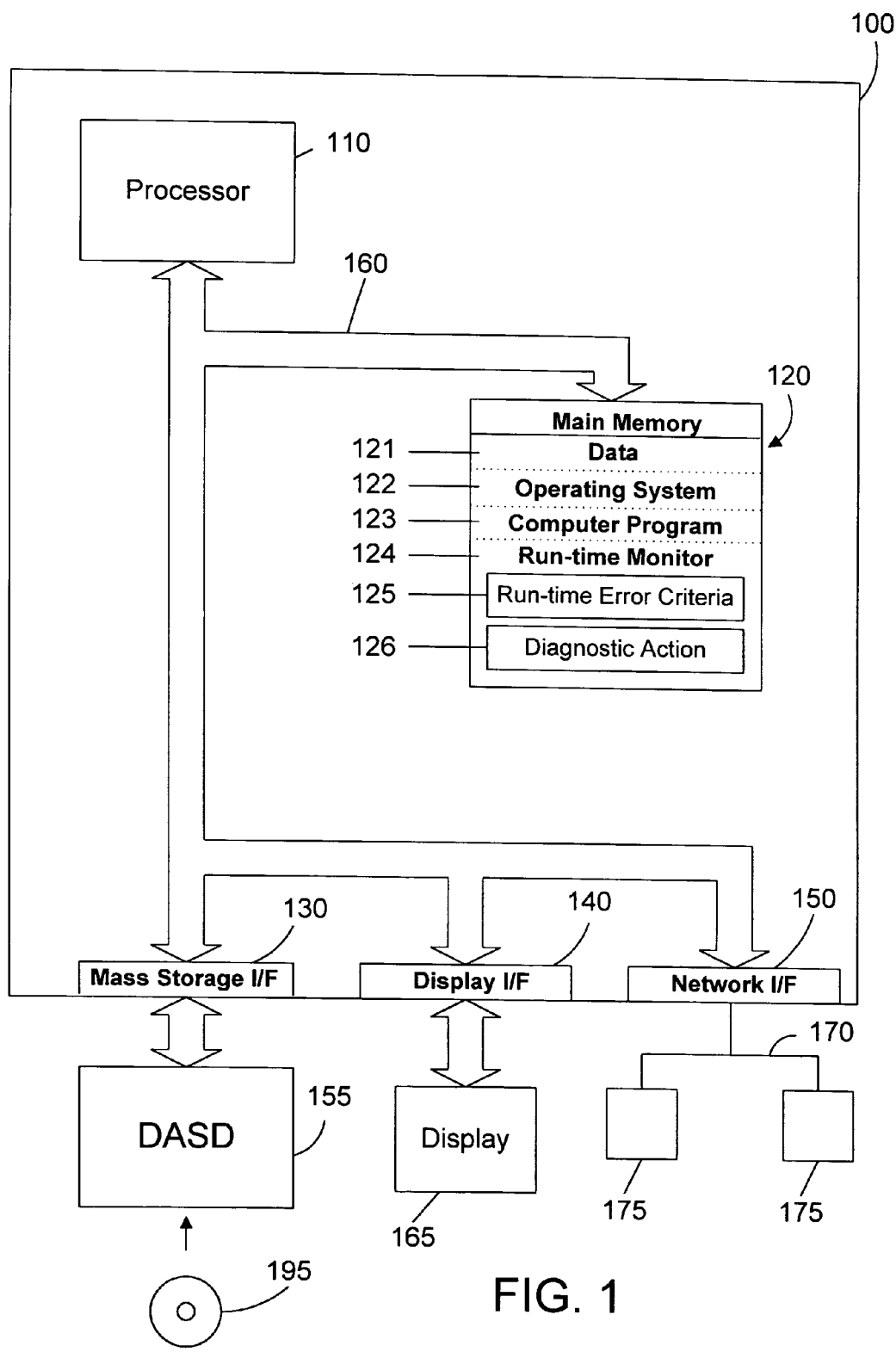
FIG. 1 is a block diagram of an apparatus in accordance with the preferred embodiments.

Referring to FIG. 1, a computer system 100 is one suitable implementation of an apparatus in accordance with the preferred embodiments of the invention. Computer system 100 is an IBM eServer iSeries computer system. However, those skilled in the art will appreciate that the mechanisms and apparatus of the present invention apply equally to any computer system, regardless of whether the computer system is a complicated multi-user computing apparatus, a single user workstation, or an embedded control system. As shown in FIG. 1, computer system 100 comprises a processor 110, a main memory 120, a mass storage interface 130, a display interface 140, and a network interface 150. These system components are interconnected through the use of a system bus 160. Mass storage interface 130 is used to connect mass storage devices, such as a direct access storage device 155, to computer system 100. One specific type of direct access storage device 155 is a readable and writable CD RW drive, which may store data to and read data from a CD RW 195.

Main memory 120 in accordance with the preferred embodiments contains data 121, an operating system 122, one or more computer programs 123, and a run-time monitor 124. Data 121 represents any data that serves as input to or output from any program in computer system 100. Operating system 122 is a multitasking operating system known in the industry as iSeries; however, those skilled in the art will appreciate that the spirit and scope of the present invention is not limited to any one operating system. Computer program 123 is any suitable program in any suitable form. Run-time monitor 124 is a software tool that monitors the run-time performance of one or more computer programs 123. Run-time monitor 124 specifies sets of run-time error criteria 125 and corresponding diagnostic actions 126. When the run-time monitor 124 detects that the run-time error criteria 125 is satisfied, the run-time monitor 124 causes the diagnostic action 126 to be performed. In this manner, the run-time monitor may kick off diagnostic actions automatically when their corresponding run-time error criteria are satisfied.

It is important to note that the term "run-time error criteria" as used herein can include any single condition, group of conditions, or heuristic. The fact that the word "criteria" is normally used in a plural sense does not limit the run-time error criteria to plural conditions or heuristics. The term "run-time error criteria" used herein and in the claims expressly extends to any and all sets of conditions, groups of conditions, and heuristics, both singular and plural.

In the prior art, it is known to perform a diagnostic function based on a singular run-time error criterion. For example, a programmer could use a debugger to specify a breakpoint on the occurrence of a particular software exception. The run-time error criteria 125 of the preferred embodiments varies from the singular run-time criterion in the prior art by specifying a rate of run-time errors per unit of time. Because computer programs often throw exceptions during normal processing, breaking execution for a single thrown exception is ofttimes not terribly useful in debugging the computer program. However, by specifying run-time error criteria 125 that is specified in terms of run-time errors per unit of time, a rate of run-time errors is of particular concern, rather than the occurrence of a single run-time error. Note that the term "unit of time" is used herein in its broadest sense to mean any denomination of time, whether fixed or variable. For example, the run-time error criteria 125 could be specified in run-time errors per second, run-time errors per 1,000 processor cycles, run-time errors between I/O accesses, etc. The run-time error criteria 125 expressly extends to any and all ways to specify a rate of run-time errors. When the monitored rate of run-time errors exceeds the run-time error criteria 125, the run-time monitor 124 initiates the corresponding diagnostic action 126.

While the run-time monitor 124 is shown in FIG. 1 to be separate from the other items in main memory 120, it is also within the scope of the preferred embodiments to include the run-time monitor 124 as part of a separate debugger, as part of the operating system 122, or as part of any other computer program. In addition, the run-time error criteria 125 and the corresponding diagnostic action 126 could be stored within the run-time monitor 124, or could be stored in any other suitable location that is accessible by the run-time monitor 124.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 121, operating system 122, computer program 123, and run-time monitor 124 are shown to reside in main memory 120, those skilled in the art will recognize that these items are not necessarily all completely contained in main memory 120 at the same time. It should also be noted that the term "memory" is used herein to generically refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Operating system 122 is a sophisticated program that manages the resources of computer system 100. Some of these resources are processor 110, main memory 120, mass storage interface 130, display interface 140, network interface 150, and system bus 160.

Although computer system 100 is shown to contain only a single processor and a single system bus, those skilled in the art will appreciate that the present invention may be practiced using a computer system that has multiple processors and/or multiple buses. In addition, the interfaces that are used in the preferred embodiment each include separate, fully programmed microprocessors that are used to off-load compute-intensive processing from processor 110. However, those skilled in the art will appreciate that the present invention applies equally to computer systems that simply use I/O adapters to perform similar functions.

Display interface 140 is used to directly connect one or more displays 165 to computer system 100. These displays 165, which may be non-intelligent (i.e., dumb) terminals or fully programmable workstations, are used to allow system administrators and users to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of computer-readable signal bearing media used to actually carry out the distribution. Examples of suitable computer-readable signal bearing media include: recordable type media such as floppy disks and CD RW (e.g., 195 of FIG. 1), and transmission type media such as digital and analog communications links.

Figure 2:
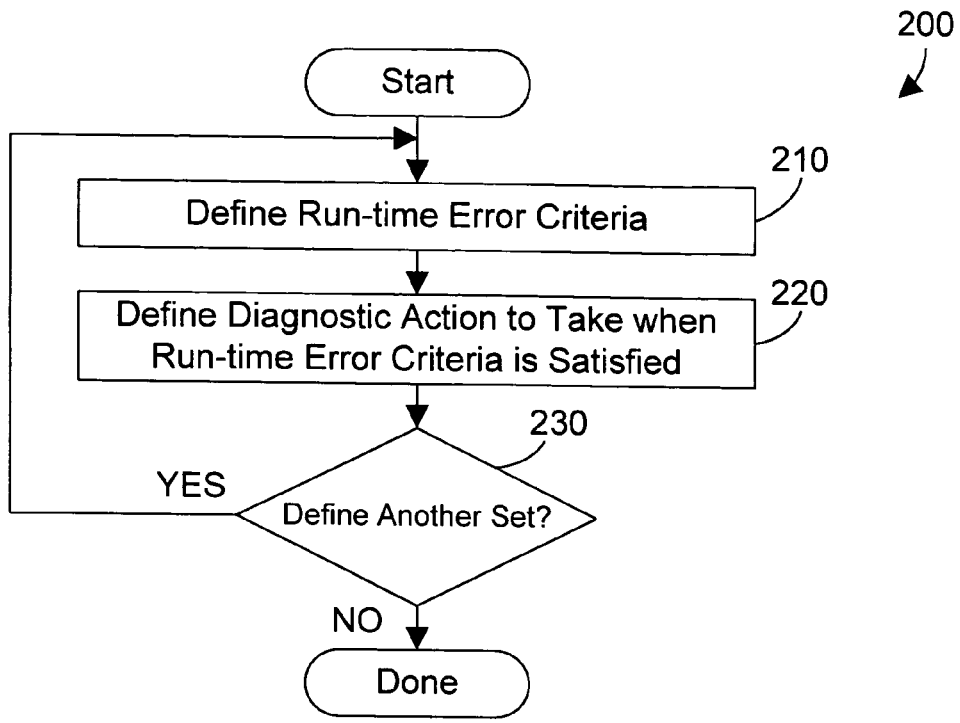
FIG. 2 is a flow diagram of a method in accordance with the preferred embodiments for defining run-time error criteria and corresponding diagnostic action to take when the run-time error criteria are satisfied.

Referring to FIG. 2, a method 200 in accordance with the preferred embodiments allows a programmer to define run-time error criteria (step 210) and a corresponding diagnostic action to take when the run-time error criteria is satisfied (step 220). If the programmer wants to define another set (step 230=YES), method 200 loops back to step 210 and continues. Once the programmer is done defining sets of run-time error criteria and corresponding diagnostic actions (step 230=NO), method 200 is done. Method 200 thus represents a method that a programmer may use within the scope of the preferred embodiments to define sets of run-time error criteria and their corresponding diagnostic actions.

Figure 3:
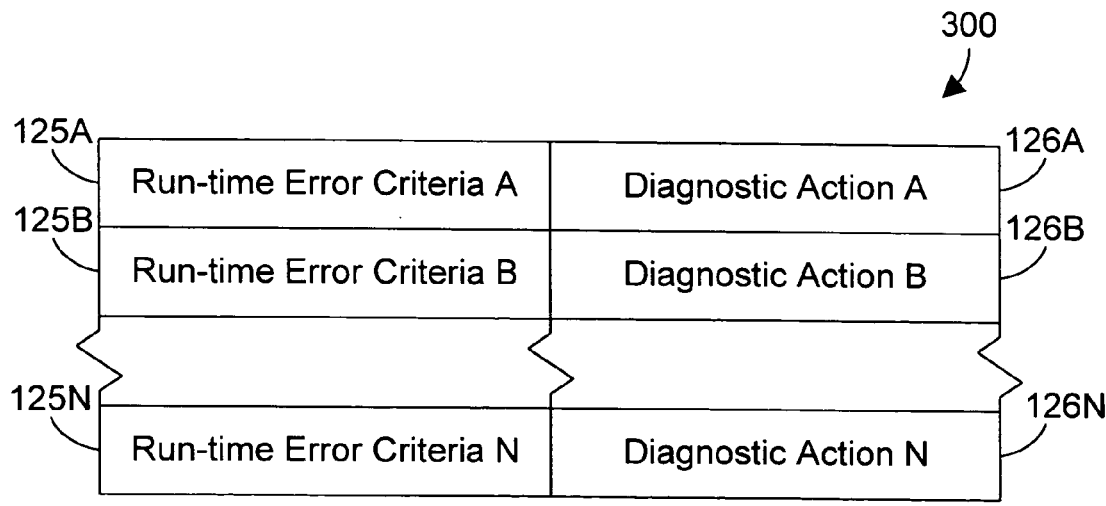
FIG. 3 is a table showing various different run-time error criteria and their corresponding diagnostic actions.

Referring to FIG. 3, a table 300 represents multiple sets of run-time error criteria 125 and their corresponding diagnostic actions 126. Thus, run-time error criteria 125A has a corresponding diagnostic action 126A; run-time error criteria 125B has a corresponding diagnostic action 126B; and so on through run-time error criteria 125N that has a corresponding diagnostic action 126N. Table 300 simply shows that each run-time error criteria preferably has its own corresponding diagnostic action in the preferred embodiments. Note, however, that it is also within the scope of the preferred embodiments to perform a single diagnostic action for all run-time error criteria.

Figure 4:
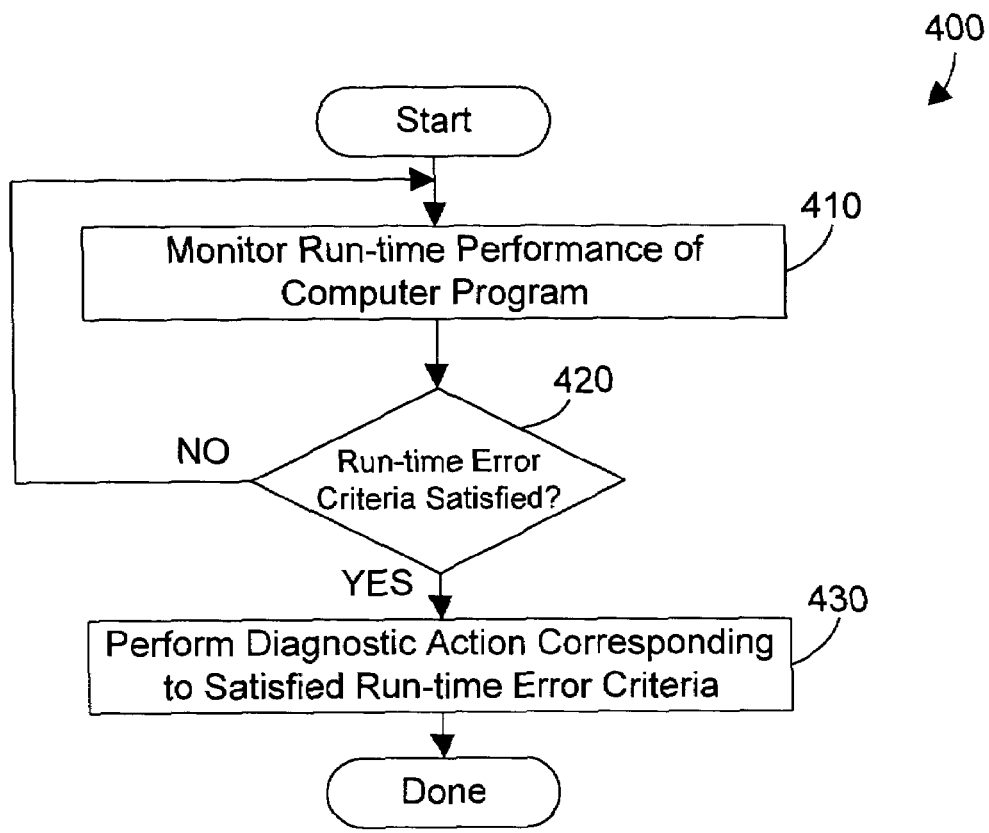
FIG. 4 is a flow diagram of a method in accordance with the preferred embodiments for monitoring run-time performance of a computer program and for performing a corresponding diagnostic action when run-time error criteria are satisfied.

Once one or more run-time error criteria 125 and corresponding diagnostic action 126 have been defined in method 200 of FIG. 2, the run-time monitor 124 may monitor the run-time performance of the computer program 123 to see if the rate of run-time errors exceeds any specified run-time error criteria. Referring to FIG. 4, a method 400 monitors run-time performance of the computer program (step 410). If the run-time error criteria is not satisfied (step 420=NO), method 400 loops back to step 410 and continues. When the run-time error criteria is satisfied (step 420=YES), the diagnostic action corresponding to the satisfied run-time error criteria is performed (step 430). Note that method 400 may simultaneously monitor for many different run-time error criteria (such as all those shown in table 300 in FIG. 3). Once any of the run-time error criteria 125 are satisfied (step 420=YES), the corresponding diagnostic action 126 is performed (step 430).

One very important feature of the preferred embodiments is the ability to measure a normal rate of run-time errors for a computer program, and to then set the run-time error criteria based on the measured rate of run-time errors. This is shown as method 500 in FIG. 5. The baseline run-time performance of the computer program is measured (step 510). One or more run-time error criteria may then be defined based on the baseline run-time performance of the computer program (step 520). Note that the term "baseline" simply refers to a run of the computer program with a defined set of operating conditions that might be considered "normal" operating conditions. Thus, if a computer program normally throws five exceptions per second of a particular exception type, this information could be used in defining the run-time error criteria for that exception type to assure that the diagnostic action is not performed for a rate of run-time errors that lies within the norm. In fact, it would be logical to multiply the rate of run-time errors by some factor in defining the run-time error criteria to initiate the diagnostic action only when some the rate of run-time errors is seen exceeds the norm by the defined factor.

Figure 5:
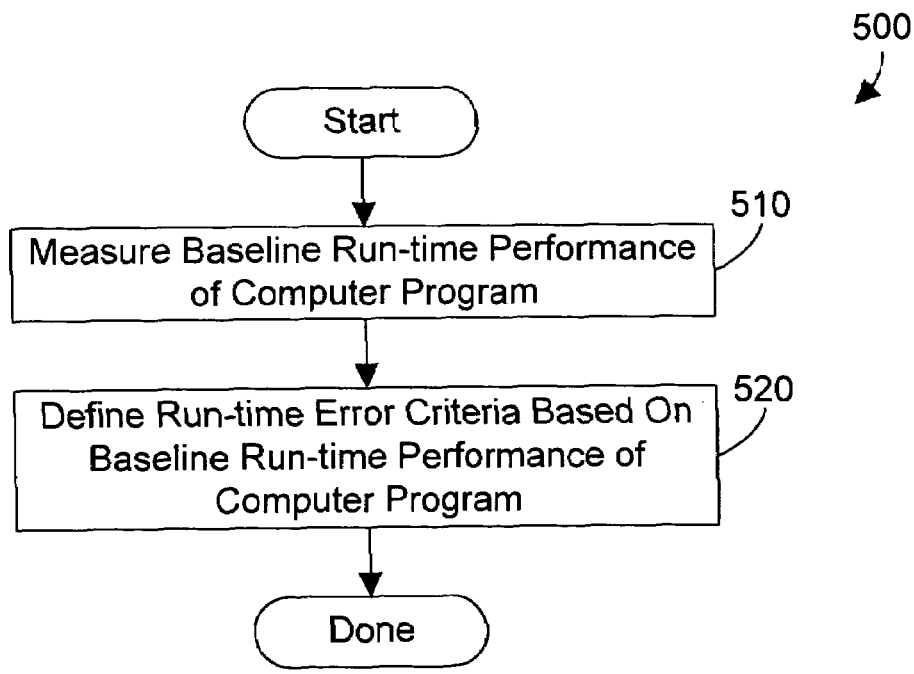
FIG. 5 is a flow diagram of a method in accordance with the preferred embodiments for defining run-time error criteria based on measured baseline run-time performance of the computer program.

A simple example for method 500 in FIG. 5 is shown in the tables of FIG. 6. We assume that the baseline run-time error rate for a particular exception is two per second, as shown in table 610. With this baseline run-time error rate defined, a programmer could then decide upon a static value of five exceptions per second as the appropriate run-time error criteria, as shown in table 620. In the alternative, a dynamic run-time error criteria could be defined that is a mathematical function of the baseline run-time error rate. As shown in table 620, a dynamic run-time error criteria could be defined that is four times the baseline rate for a specified period of time. Thus, the dynamic run-time error criteria shown in table 620 would trigger the diagnostic action when the run-time error rate for the computer program exceeds eight exceptions per second for a ten second time period.

A powerful feature of the preferred embodiments is the ability to specify different diagnostic actions depending on the type of run-time error that occurs. In the Java programming language, there are many different software exceptions that are defined. These exceptions are processed when a run-time error occurs in the computer program. The diagnostic action to be taken can vary according to the type of exception that occurs. Note that table 700 in FIG. 7 does not show the run-time error criteria corresponding to the diagnostic actions, but these are understood to exist. For the java.sql.SQLException 710, which is an exception that occurs when SQL encounters an error while accessing a database, the corresponding diagnostic action is to turn the database monitor on 712. Thus, when the specified run-time error criteria for the java.sql.SQLException is satisfied, the database monitor is turned on. For the java.lang.ClassNotFoundException 720, which is an exception that occurs when a class needs to be loaded but cannot be found, the corresponding diagnostic action is to record the current classpath and classloaders being used 722. This information helps to determine where the error occurs in the computer program. For the java.io.IOException 730, which is an exception that occurs when I/O is unavailable, the corresponding diagnostic action is to check the disk space, and allow the disk space to grow in certain controlled circumstances 732. For the java.net.rmi.ConnectException 740, the corresponding diagnostic action is to invoke a tool known as "netstat" that verifies communication interfaces 742. In similar fashion, for the java.net- .SocketTimeoutException 750, the corresponding diagnostic action is to invoke the "netstat" tool to verify communication interfaces 752. For the java.rmi.RemoteException 760, the corresponding diagnostic action is to ping remote system to verify they are still active 762. For the java.rmi.UnknownHostException 770, the corresponding diagnostic action is to check if the Domain Name Server (DNS) is active 772. Table 700 is shown as a very simple example to illustrate how different diagnostic actions may be specified for different types of exceptions. These different diagnostic actions help a programmer to more easily locate the portions of the computer program that are causing the excessive number of run-time errors. Note that the run-time error criteria that correspond to the diagnostic actions in table 700 may be defined independently of the diagnostic action, as shown by the simple example in FIG. 6.

Figure 8:
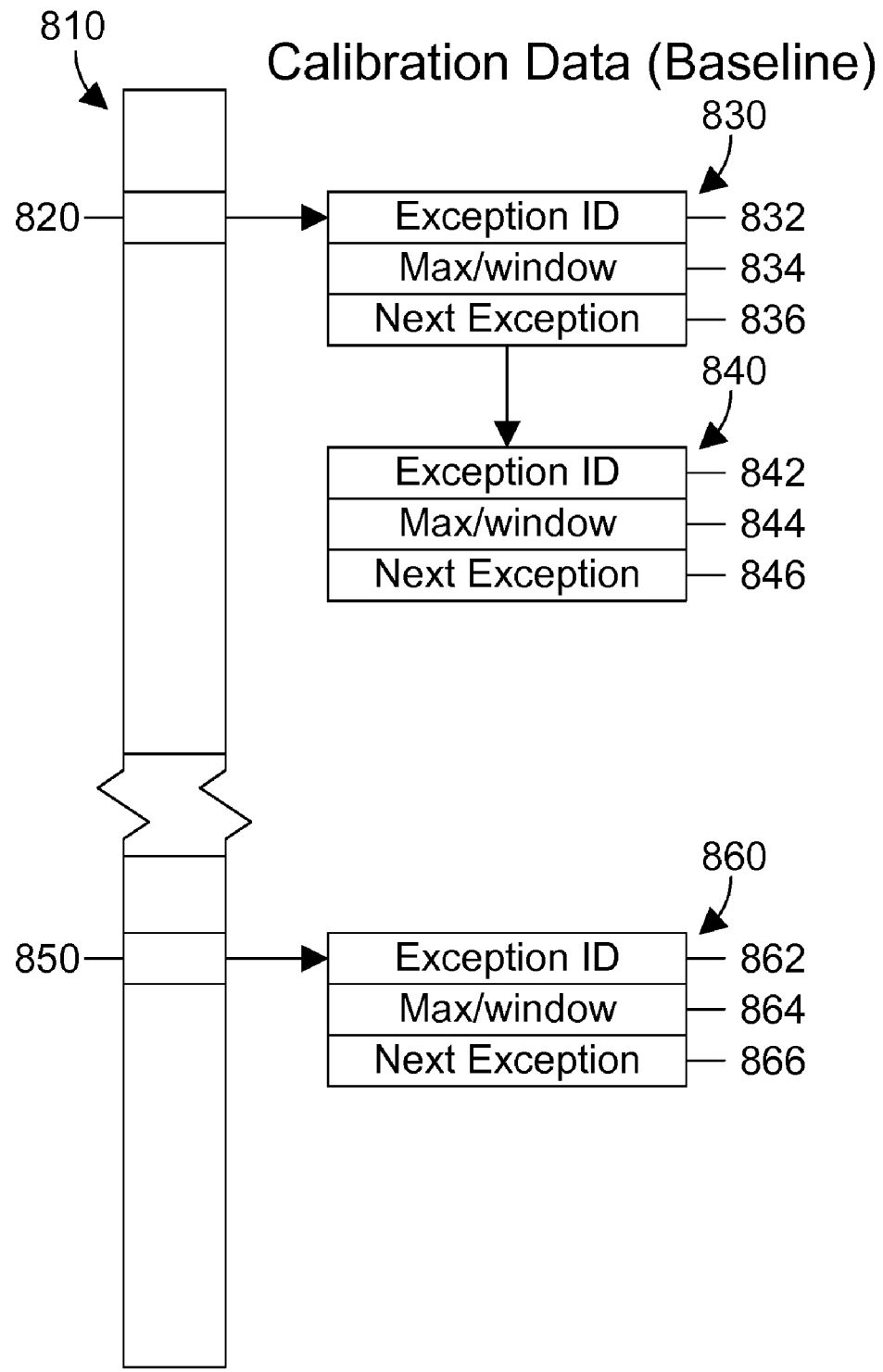
FIG. 8 is a block diagram of a sample system showing calibration data (baseline) for a sample computer program.

We now present a very simple example in FIGS. 8-12 to illustrate the concepts of the preferred embodiments discussed above. We assume there is an array 810 that contains an entry for each line in the computer program 123 that is being monitored by run-time monitor 124. The array 810 contains pointers to exceptions that occur at that line in the computer program. Note that array 810 in FIG. 8 contains calibration data, which means baseline data for an execution of the computer program with a defined set of conditions. The calibration (or baseline) data preferably relates to a "normal" execution of the computer program. Entry 820 in array 810 contains a pointer to an entry 830 that includes an exception ID 832, a maximum number of those exceptions that occurred in a defined window of time 834, and a pointer to the next exception 836. In this example, two different types of exceptions have occurred at the line of code corresponding to entry 820 in the array, so there are two different exception entries 830 and 840 that correspond to entry 820. Entry 840 also includes an exception ID 842 and a maximum number of those exception that occurred in a defined window of time 844, and a pointer to the next exception 846. In this specific example, the next exception pointer 846 would be null because it is the last entry in the linked list. FIG. 8 also shows a second array entry 850 that has a pointer to an entry 860 that specifies an exception ID 862, a maximum number of exceptions of this type that occurred in a defined window of time 864, and a next exception pointer 866. Again in this example, the next exception pointer 866 would be null because entry 860 is the last (and only) entry in the list.

While array 810 is shown to contain entries that correspond to lines of code, one skilled in the art will realize that a similar array could correspond to various degrees of granularity in the computer program. Thus, a similar array could have entries that correspond to blocks, methods or procedures in the computer program instead of individual lines.

Figure 9:
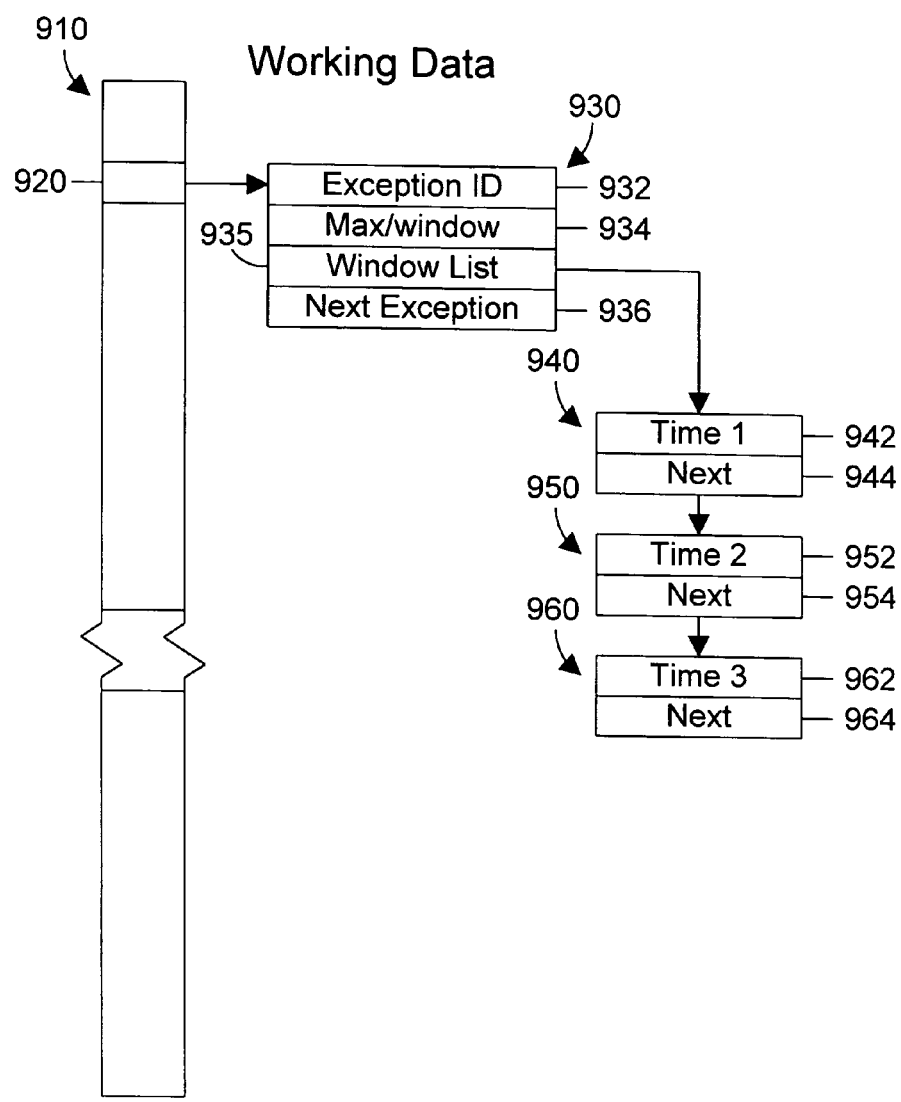
FIG. 9 is a block diagram of a sample system showing working data for a sample computer program.

FIG. 9 shows a similar array 910 that contains pointers to entries that log run-time errors in the computer program. Note that array 910 in FIG. 9 contains working data, meaning data that is collected during an execution of the computer program that is being monitored by the run-time monitor 123 in FIG. 1. The array 910 includes an entry 920 that contains a pointer to an entry 930 that includes an exception ID 932, a maximum number of exceptions of that type in the defined window of time 934, and a next exception pointer 936. Entry 930 additionally includes a window list 935 that includes zero to N entries. For the example shown in FIG. 9, the window list 935 includes three entries 940, 950 and 960. Entry 940 has a corresponding timestamp 942 that indicates when an exception that matches the exception ID 932 occurred at the line of code corresponding to entry 920 in the computer program. Entry 940 also includes a next entry pointer 944. Entry 950 has a corresponding timestamp 952 and a next entry pointer 954. Entry 960 has a corresponding timestamp 962 and a next entry pointer 964. The value of the next entry pointer 964 in FIG. 9 is null because entry 960 is the last in the linked list.

Figure 10:
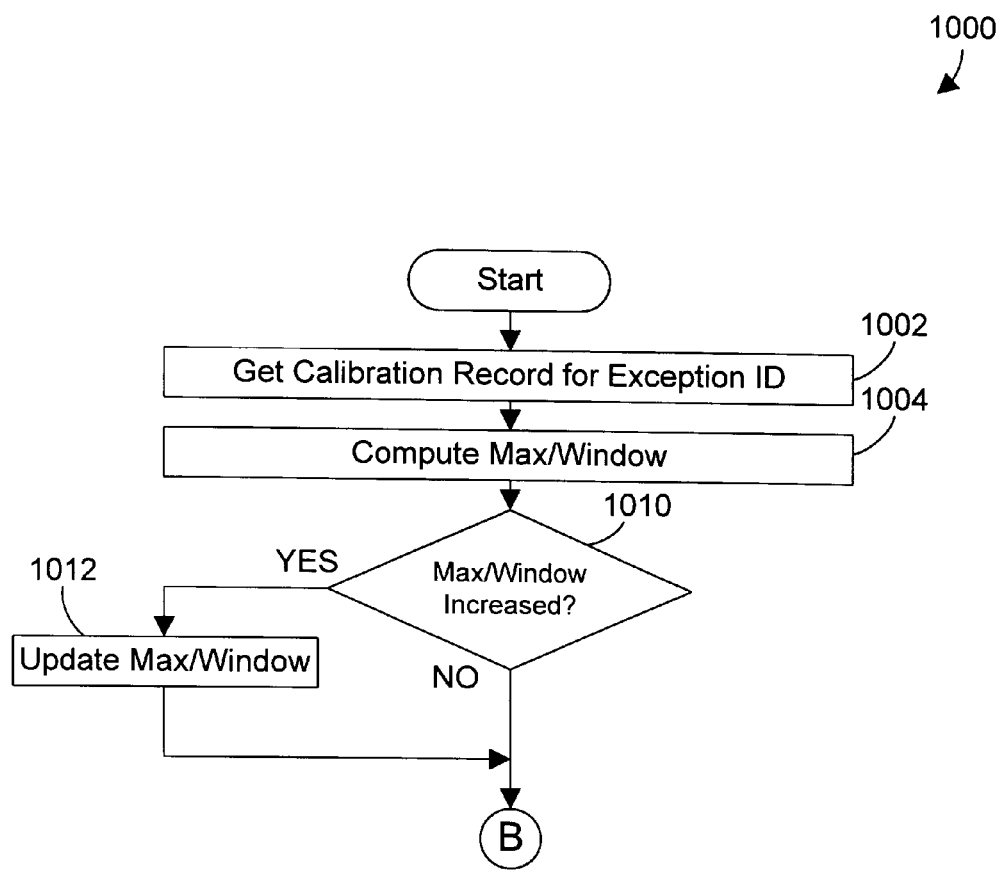
FIGS. 10-12 show a flow diagram of a method in accordance with the preferred embodiments for defining run-time error criteria for the sample system represented in FIGS. 8 and 9, and for initializing diagnostic function when the run-time error criteria are satisfied.
Figure 11:
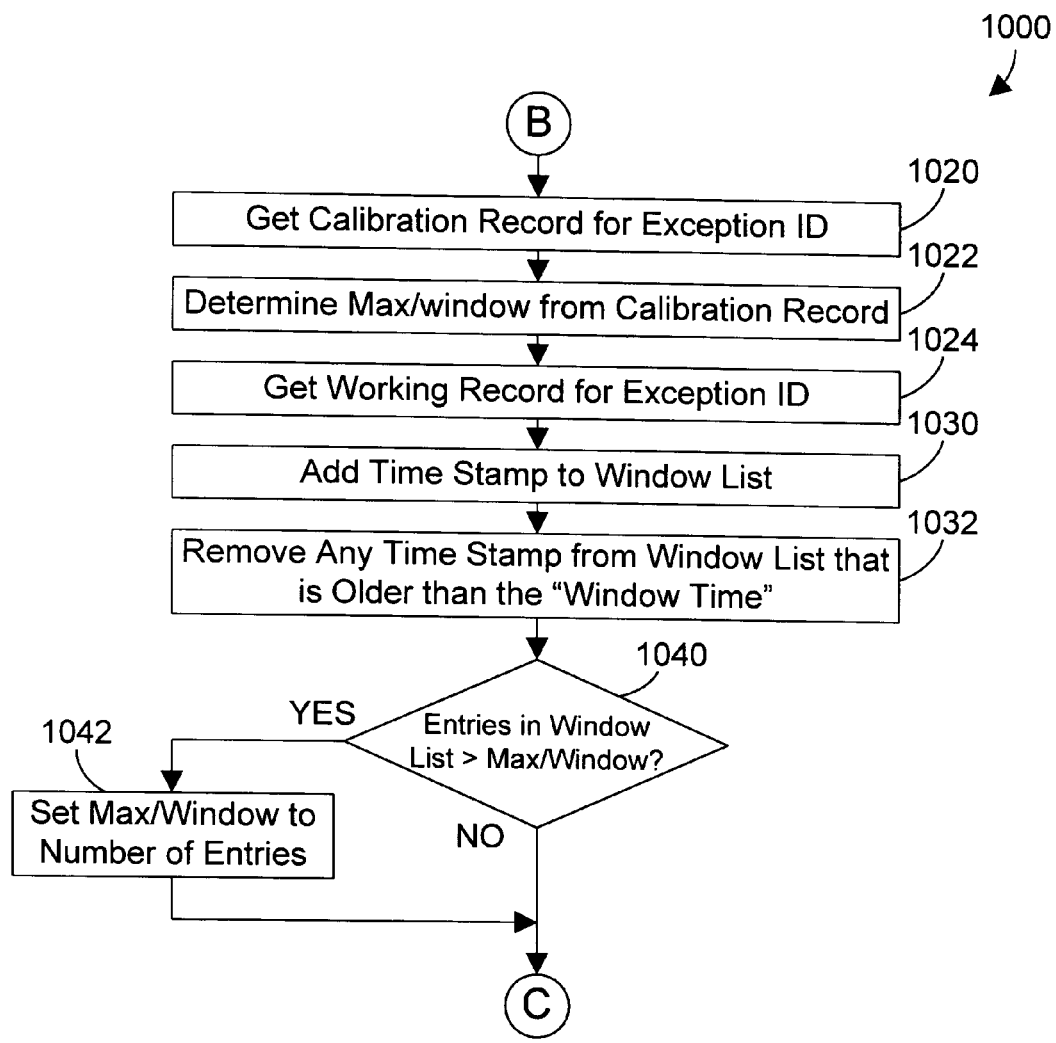
Figure 12:
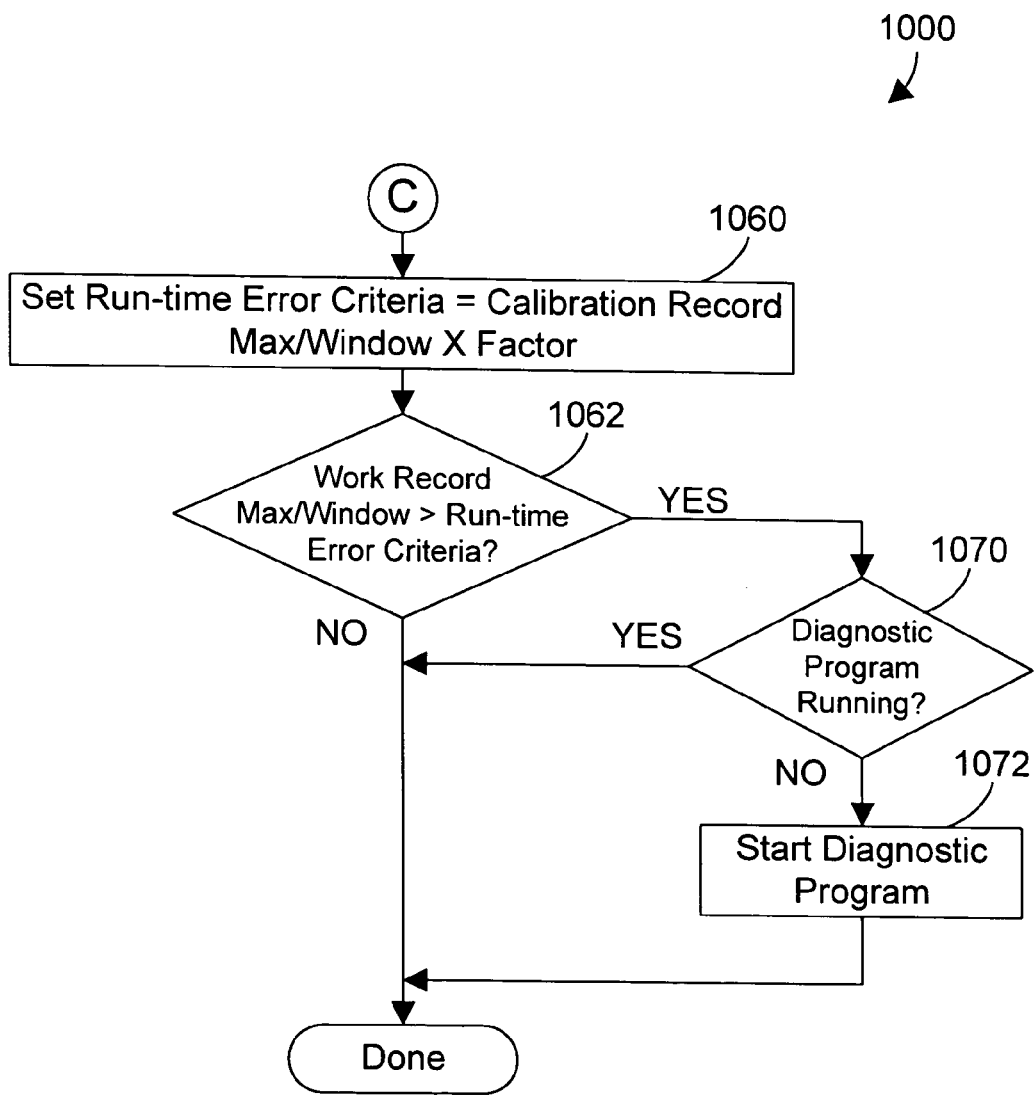

We now refer to method 1000 shown in FIGS. 10-12 to understand the function of this sample implementation in FIGS. 8 and 9. FIG. 10 shows preliminary steps that are performed in order to load the calibration data into the array 810 shown in FIG. 8. For a particular line of code in the computer program, the calibration record for a specified exception ID is retrieved (step 1002). A maximum number of exceptions of that type for a defined window of time is computed (step 1004). This max/window value is performed by the method 1000 repeatedly monitoring exceptions that occur during a calibration run of the computer program, and determining the maximum number of exceptions of the specified type (that correspond to the Exception ID) that occur during the specified time window at a specified line of code in the computer program. If the computation of maximum number of run-time errors in the defined window period increases over the previously-stored value (step 1010=YES), the max/window value is updated to the increased value (step 1012). Note that the steps in FIG. 10 would preferably be repeated for every exception type at every entry in array 810. Of course, the measuring of the calibration data could be done on all entries and exception types simultaneously within the scope of the preferred embodiments.

The steps shown in FIG. 11 represent the steps for determining whether an actual run of the computer program generates run-time errors at a rate greater than the specified run-time error criteria. The calibration record for the exception id is retrieved (step 1020). The max/window is read from the calibration record (step 1022). The working record for the exception ID is then retrieved (step 1024). A time stamp is added to the window list (step 1030) that represents the time that the monitored exception occurred. Any time stamp that is older than the specified "window time" is then removed from the list (step 1032). If the number of entries in the window list exceed the max/window specified in the calibration data (step 1040=YES), the max/window in the working data is set to the number of entries (step 1042). Steps 1020-1042 thus log the data from an actual run of the computer program to determine whether an excessive rate of run-time errors occurs. Note that the steps in FIG. 11 could be repeated for each exception ID and for each entry in the working data array 910.

The steps in FIG. 12 show the processing that occurs to determine whether the run-time error criteria has been satisfied. The run-time error criteria is set to equal the calibration record max/window value multiplied by some factor (step 1060). If the work record max/window value exceeds the run-time error criteria (step 1062=YES), the diagnostic action corresponding to the run-time error criteria needs to be performed. In FIG. 12, if the desired diagnostic program is already running (step 1070=YES), no action is required. On the other hand, if the corresponding diagnostic program is not running (step 1070=NO), the corresponding diagnostic program is started (step 1072). If the work record max/window is not greater than the run-time error criteria (step 1062=NO), no action is required, because the rate of errors in the present execution of the computer program does not exceed the specified run-time error criteria.

The preferred embodiments provide a significant advance over the prior art by specifying a rate of run-time errors as a threshold, and performing a corresponding diagnostic action only when the rate of run-time errors exceeds the specified threshold. In this manner, a normal rate of run-time errors may be ignored, thereby allowing a programmer to more quickly determine the cause of an excessive rate of run-time errors.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

What is claimed is:

1. A method for initiating diagnostic action in response to monitoring the execution of a computer program, the method comprising the steps of:
    (A) monitoring execution of the computer program to determine whether specified run-time error criteria are satisfied during the execution of the computer program, the run-time error criteria specifying a rate of run-time errors per unit of time;
    (B) if the run-time error criteria are satisfied, initiating at least one diagnostic action corresponding to the satisfied run-time error criteria;
    (C) measuring a rate of run-time errors per unit of time with a defined set of operating conditions for the computer program; and
    (D) determining the run-time error criteria based on the measured rate of run-time errors per unit of time with the defined set of operating conditions.

2. The method of claim 1 further comprising the step of defining a plurality of run-time error criteria and corresponding diagnostic action for each of the plurality of run-time error criteria.

3. The method of claim 1 wherein the diagnostic action comprises running a diagnostic computer program.

4. The method of claim 1 wherein the run-time error criteria is a mathematical function of the measured rate of run-time errors per unit of time with the defined set of operating conditions.

5. The method of claim 1 wherein each run-time error comprises a software exception.

6. A method for initiating diagnostic action in response to monitoring the execution of a computer program, the method comprising the steps of:
    (A) measuring a rate of run-time errors per unit of time with a defined set of operating conditions for the computer program;
    (B) determining run-time error criteria based on the measured rate of run-time errors per unit of time with the defined set of operating conditions, the run-time error criteria specifying a rate of run-time errors per unit of time, wherein the run-time error criteria is a mathematical function of the measured rate of run-time errors per unit of time with the defined set of operating conditions;
    (C) monitoring execution of the computer program to determine whether the run-time error criteria determined in (B) are satisfied during the execution of the computer program; and
    (D) if the run-time error criteria are satisfied, initiating at least one diagnostic action corresponding to the satisfied run-time error criteria.

7. The method of claim 6 further comprising the step of defining a plurality of run-time error criteria and corresponding diagnostic action for each of the plurality of run-time error criteria.

8. The method of claim 6 wherein the diagnostic action comprises running a diagnostic computer program.

9. The method of claim 6 wherein each run-time error comprises a software exception.

* * * * *